United States Patent
Hergenrother et al.

(10) Patent No.: US 7,393,564 B2
(45) Date of Patent: *Jul. 1, 2008

(54) RUBBER COMPOSITIONS AND ARTICLES THEREOF HAVING IMPROVED METAL ADHESION

(75) Inventors: William L. Hergenrother, Akron, OH (US); Steven E. Schonfeld, Akron, OH (US); Frederick J. Ravagnani, deceased, late of Uniontown OH (US); by Roberta A Ravagnani, legal representative, Akron, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/453,366

(22) Filed: Jun. 14, 2006

(65) Prior Publication Data

US 2007/0010606 A1 Jan. 11, 2007

Related U.S. Application Data

(63) Continuation of application No. 10/323,458, filed on Dec. 18, 2002, now Pat. No. 7,201,944.

(51) Int. Cl.
*B32B 15/02* (2006.01)
*B32B 15/06* (2006.01)
*B32B 15/18* (2006.01)

(52) U.S. Cl. .......... 427/334; 252/511; 427/327; 428/450; 428/461; 524/262; 524/265; 524/492; 524/502; 524/515; 524/528

(58) Field of Classification Search .......... 427/334, 427/327; 428/450, 461; 524/262, 265, 492, 524/502, 515, 528; 252/511
See application file for complete search history.

(56) References Cited

U.S. PATENT DOCUMENTS

| 4,052,524 A | 10/1977 | Harakas et al. |
| 4,441,946 A | 4/1984 | Sharma |
| 4,474,908 A | 10/1984 | Wagner |
| 5,126,501 A | 6/1992 | Ellul |
| 5,830,930 A | 11/1998 | Mahmud et al. |
| 5,882,799 A | 3/1999 | Roseboom et al. |
| 6,172,138 B1 | 1/2001 | Materne et al. |
| 6,416,869 B1 | 7/2002 | van Ooij et al. |
| 6,465,544 B1 * | 10/2002 | Bomal et al. ........ 523/213 |
| 6,624,220 B1 | 9/2003 | Waddell et al. |
| 7,066,228 B2 | 6/2006 | Grimberg et al. |
| 2003/0069332 A1 | 4/2003 | Agostini et al. |

FOREIGN PATENT DOCUMENTS

| EP | 0 141 133 B1 | 10/1987 |
| EP | 0 953 593 A1 | 11/1999 |
| WO | WO 96/37547 | * 11/1996 |

OTHER PUBLICATIONS

W.J. Van Ooij & S.K. Jayaseelan, "New Developments in Rubber-Steel Bonding Processes," American Chemical Society mtg., Rubber Division, Oct. 17-20, 2000 (Cincinnati, Ohio).
L.J. Murphy, M-J Wang & K. Mahmud, "Carbon-Silica Dual Phase Filler, A New Generation Reinforcing Agent for Rubber—Part III: ESCA and IR Characterization of Carbon-Silica Dual Phase Fillers," American Chemical Society mtg., Rubber Division, Oct. 21-24, 1997 (Cleveland, Ohio).
M-J Wang, P. Zhang & K. Mahmud, "Carbon-Silica Dual Phase Filler, A New Generation Reinforcing Agent for Rubber—Part IX: Application to Truck Tire Tread Compound," American Chemical Society mtg., Rubber Division, Apr. 4-6, 2000 (Dallas, Texas).
M-J Wang, Y. Kausovsky, P. Zhang, G. Mehos, L.G. Murphy & K. Mahmud, "Effect of Functionalization of Carbon Black on Rubber Properties—Using CSDPF 2000 and CSDPF 4000 to Improve Global Compromise Between Rolling Resistance, Wear Resistance and Wet Skid Resistance for Tires," Functional Tire Fillers 2001 conference, Jan. 29-31, 2001 (Ft. Lauderdale, Fla.).

* cited by examiner

*Primary Examiner*—Ana Woodward
(74) *Attorney, Agent, or Firm*—Meredith E. Hooker; David Burleson

(57) ABSTRACT

A vulcanizable rubber composition having improved adhesion and adhesion retention properties with steel reinforcement includes up about 10 pbw of a compound selected from aminosilanes and/or mercaptosilanes per 100 parts of the rubber component in the rubber composition. The silane component can be incorporated into the rubber composition prior to curing. Composite structures and methods for providing the rubber composition also are provided.

18 Claims, No Drawings

RUBBER COMPOSITIONS AND ARTICLES THEREOF HAVING IMPROVED METAL ADHESION

CROSS REFERENCE TO RELATED APPLICATION

This is a continuation application of presently U.S. patent application Ser. No. 10/323,458, filed Dec. 18, 2002, now U.S. Pat. No. 7,201,944, the disclosure of which is incorporated herein by reference.

BACKGROUND OF THE INVENTION

The present invention is directed toward improving the adhesion and adhesion retention between a rubber composition and metallic reinforcement cord, such as steel wire and cable which is embedded in the rubber stock. Flat sheets or strips of such stocks, reinforced with metal or fibers, are utilized as plies or other components in the manufacture of tires, repair stocks for retreading tires, conveyor belts, hoses and the like and are referred to in the art as rubber skim stocks. Skim refers to a relatively thin layer or coating of the rubber over the reinforcement filaments or cords. Greater thicknesses of rubber are also bonded to metal in other instances such as motor mounts and golf club shafts and these would not be termed skim stocks.

In the manufacture of the such rubber articles, particularly steel-belted bias and radial tires, reinforcing the rubber skim stock material with steel wire or cable is common. One of the more important uses for a metallic reinforced rubber is as a belt where one or more of these belts are substantially circumferentially oriented beneath the tread stock to maintain the integrity and shape of the tire during inflation and subsequent load. Other areas where metal reinforced rubber skim stock may be utilized is in the body ply, bead or chafer of a tire.

Many methods for promoting adhesion between vulcanizable rubber and steel reinforcement cords are known. For instance, steel reinforcement cords commonly are plated with compositions designed to promote and maintain adhesion to vulcanized rubber. This method generally promotes adhesion to vulcanized rubber wherever the surface plating contacts the vulcanized rubber. However, during construction of a tire, plated steel reinforcement cords are typically cut to fixed lengths, and the cutting process leaves a bright steel core exposed at the cross sections where cutting has occurred. As a result, the exposed bright steel core lacks the surface coating and therefore will not adhere to the vulcanized rubber of the tire, which could diminish tire performance. There is, therefore, a need for a method that promotes adhesion between a bright steel surface and vulcanized rubber.

To promote adhesion between rubber and ferrous metals it is known to employ a variety of metallic salts or complexes or other additives as coatings to the metal or as an ingredient in a rubber composition.

Thus, while others have sought to enhance adhesion between rubber compositions and bright steel by employing materials such as cobalt para-aminobenzoate and para-amino-benzoic acid in the stock, the art of which we are aware has not disclosed the exclusive use of the silane compounds set forth hereinbelow in a vulcanizable rubber stock to increase adhesion properties between rubber and metallic reinforcement, particularly bright steel.

SUMMARY OF THE INVENTION

The present invention provides a vulcanizable rubber composition having incorporated, prior to curing, from about 0.1 to about 10 parts by weight (pbw) of a compound selected from aminosilanes and mercaptosilanes and mixtures thereof per 100 parts of the rubber component in the rubber composition. The composition exhibits improved adhesion and adhesion retention properties with bright steel.

The present invention also provides a structural component for a pneumatic tire containing a cured rubber composition having improved metal adhesion and metal adhesion retention properties with bright steel. The composition is provided as described above.

A method for improving metal adhesion and metal adhesion retention properties between a vulcanizable rubber composition and bright steel also is provided. The process includes incorporating from about 0.1 to about 10 pbw of a compound selected from amino-silanes and mercaptosilanes and mixtures thereof per 100 parts of the rubber component in the rubber composition into the rubber composition prior to curing.

DETAILED DESCRIPTION OF ILLUSTRATIVE EMBODIMENTS

To illustrate the invention, a typical example of a rubber component with metallic reinforcement embedded therein was chosen, specifically a rubber skim stock suitable for preparing rubber articles such as tires. Adhesion between this stock with steel reinforcement subsequent to vulcanization was measured and has also been presented hereinbelow.

Both synthetic and natural rubber may be employed in the vulcanizable rubber composition. These rubbers, which may also be referred to as elastomers, include, without limitation, natural or synthetic poly(isoprene) with natural polyisoprene being preferred, and elastomeric diene polymers including polybutadiene and copolymers of conjugated diene monomers with at least one monoolefin monomer. Suitable polybutadiene rubber is elastomeric and has a 1,2-vinyl content of about 1 to 3% and a cis-1,4 content of about 96 to 98%. Other butadiene rubbers, having up to about 12% 1,2-content, may also be suitable with appropriate adjustments in the level of other components, and thus, substantially any high vinyl, elastomeric polybutadiene can be employed. The copolymers may be derived from conjugated dienes such as 1,3-butadiene, 2-methyl-1,3-butadiene (isoprene), 2,3-dimethyl-1,2-butadiene, 1,3-pentadiene, 1,3-hexadiene and the like, as well as mixtures of the foregoing dienes. A preferred conjugated diene is 1,3-butadiene.

The monoolefinic monomers can include vinyl aromatic monomers such as styrene, α-methyl styrene, vinyl naphthalene, vinyl pyridine and the like, as well as mixtures of the foregoing. The copolymers may contain up to 50% by wt. of monoolefin based upon the total weight of copolymer. A preferred copolymer is a copolymer of a conjugated diene, especially butadiene, and a vinyl aromatic hydrocarbon, especially styrene. Preferably, the rubber compound can include up to about 35% by wt., more preferably 15 to 25% by wt., styrene/butadiene random copolymer.

The above-described copolymers of conjugated dienes and their method of preparation are well known in the rubber and polymer arts. Many of the polymers and copolymers are commercially available. Practice of the present invention is not limited to any particular rubber included hereinabove or excluded.

The rubber polymers used can include either 100 pbw of natural rubber, 100 pbw of a synthetic rubber or blends of synthetic rubber or blends of natural and synthetic rubber such as 75 pbw of natural rubber and 25 pbw of polybutadiene. Polymer type(s) is not deemed to be a limitation to the practice of the instant invention.

The vulcanizable rubber compounds of the present invention contain conventional filler materials. Typical filler materials include reinforcing fillers normally used in rubber formulations such as carbon blacks, talcs, silica and other finely divided mineral materials. Carbon black and silica are particularly preferred. Silica and other filler materials excluding carbon black are optionally compounded with elastomers in amounts ranging from 0 to about 80 pbw per 100 parts of rubber (phr).

Generally, the elastomers are compounded with carbon black in amounts ranging from about 5 to about 100 phr, with about 5 to about 80 phr being preferred and from about 40 to about 70 phr being more preferred. Mixtures of fillers including carbon black can be employed in the foregoing amounts. The carbon blacks may include any of the commonly available, commercially-produced carbon blacks but those having a surface area (EMSA) of at least 20 $m^2/g$ and, more preferably, at least 35 up to 200 $m^2/g$ or higher are preferred. Surface area values used in this application are those determined by ASTM test D-1765 using the cetyltrimethyl-ammonium bromide (CTAB) technique.

Useful carbon blacks include furnace black, channel blacks and lamp blacks. Specific examples include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following TABLE I.

TABLE I

Carbon Blacks

| ASTM Designation (D-1765-82a) | Surface area, $m^2/g$ (D-3765) |
|---|---|
| N-110 | 126 |
| N-220 | 111 |
| N-339 | 95 |
| N-330 | 83 |
| N-343 | 90 |
| N-550 | 42 |
| N-660 | 35 |

The vulcanizable rubber compounds are cured by sulfur and thus, a sulfur curing agent, such as sulfur or a sulfur donor is required. Minimally, at least about 2 phr sulfur, or an equivalent amount of sulfur donor, is added to the compound to provide high modulus. A sulfur-in-oil blend, comprising about 80% by wt. sulfur and 20% by wt. oil, can be used. The oils employed are conventional rubber processing oils. Conventional cure accelerators are also employed to provide fast modulus generation during cure. The vulcanizable rubber compounds also include from about 1 to 3 phr of an antioxidant and an antiozonant of conventional types (employed in the usual amounts) to impart good heat resistance.

The compounds of the present invention can contain conventional antioxidants, antiozonants and accelerators, as is shown in the exemplary formulations which follow. Such components are well known to those skilled in the art and, thus, the present invention is not limited to the use of any particular antioxidants, antiozonants or accelerators, or amounts thereof. Similarly, practice of the present invention is also not limited to the specific formulations presented herein.

The additive component includes silane compounds such as the aminosilanes (3-aminoalkyl triethoxy silane, where the alkyl is $C_2$-$C_8$) and the mercaptosilanes (3-mercapto-propyl triethoxy silane) as well as mixtures thereof. The amino groups can be 1°, 2° or 3° and include alkyl aminos having up to about eight carbon atoms. Both silane compounds can be obtained from 3-chloropropyl trichloro silane.

The silane compounds can be incorporated into the rubber skim stock in amounts ranging from about 0.1 to about 10 phr. Preferably, silane compounds are incorporated into the rubber skim stock in amounts ranging from about 0.5 to about 5 phr.

Silane compounds can be compounded into the rubber composition by using conventional techniques such as banbury batch processing, single or twin screw extrusion, continuous mixing, co-kneader extrusion, and mill mixing. Of these techniques, banbury batch processing is preferably employed.

Any conventional steel can be employed in practicing the present invention; nonlimiting examples include low, medium, and high-carbon grades of steel. Low carbon steel is preferably employed in practicing the present invention.

In the tests which follow, four rubber skim stock masterbatches (A-D) which did not contain adhesion promoting silane compounds were prepared. Masterbatch A contained resorcinol as an adhesion promoter, Masterbatch B contained no adhesion promoting components, Masterbatch C contained hydrocarbon resin and Manobond™ C cobalt- and boron-containing additive (OM Group, Inc.; Cleveland, Ohio), and Masterbatch D contained resorcinol, hydrocarbon resin and Manobond™ C additive as adhesion promoters. (Improved adhesion in a natural rubber stock containing Manobond™ C has been demonstrated in U.S. Pat. No. 4,267, 079.) The formulations of Masterbatches A-D are presented in Table II with all parts given in phr.

TABLE II

Skim Stock Masterbatches

|  | A | B | C | D |
|---|---|---|---|---|
| Natural rubber | 100 | 100 | 100 | 75 |
| Polybutadiene | — | — | — | 25 |
| Carbon black | 50 | 50 | 55 | 40 |
| Silica | — | — | — | 10 |
| Zinc oxide | 7.5 | 7.5 | 7.5 | 4.0 |
| Stearic acid | 0.5 | 0.5 | 0.5 | 1.0 |
| Santoflex DD[a] | 2.0 | 2.0 | 2.0 | — |
| Aromatic oil | — | — | 2.0 | — |
| Santoflex 13[b] | 1.0 | 1.0 | 1.0 | 1.0 |
| Resorcinol | 2.0 | — | — | 2.5 |
| Hydrocarbon resin[c] | — | — | 2.0 | 5.0 |
| Manobond C additive | — | — | 2.0 | 3.5 |
| TOTAL | 163 | 161 | 171 | 167 |

[a] 6-dodecyl-1,2-dihydro-2,2,4-trimethyl quinoline
[b] N-(1,3-dimethylbutyl)-N-phenyl-p-phenylenediamine
[c] Petroleum derived aliphatic hydrocarbon resin Each masterbatch was thereafter fully compounded with cure packages and the adhesion promoting silane compounds of the present invention. Masterbatch A was utilized to formulate examples 1-4; examples 1 and 2 contained, respectively, 0.5 and 2 phr amino-silane (3-aminopropyl triethoxy silane), while examples 3 and 4 contained, respectively, 0.5 and 2 phr mercaptosilane (3-mercaptopropyl triethoxy silane). Masterbatch B was utilized to formulate examples 5-8; examples 5 and 6 contained, respectively, 0.5 and 2 phr aminosilane, while examples 7 and 8 contained, respectively, 0.5 and 2 phr mercaptosilane. Masterbatch C was utilized to formulate examples 9-12; examples 9 and 10 contained, respectively, 0.5 and 2 phr aminosilane, while examples 11 and 12 contained, respectively, 0.5 and 2 phr mercapto-silane. Masterbatch D was utilized to formulate examples 13-16; examples 13 and 14 contained, respectively, 0.5 and 2 phr aminosilane, while examples 15 and 16 contained, respectively, 0.5 and 2 phr mercaptosilane.

The formulations of the Masterbatches A-D and subsequent rubber skim stocks have been presently to enable those skilled in the art to evaluate practice of the invention. As such, the present invention is not to be limited only to these specific formulations.

Each of the 16 compositions was used to build T-adhesion pads with bright steel. Steel cord style is not a limitation to the present invention and, therefore, other styles of steel cord are applicable.

A preferred embodiment for practicing the present invention is in a tire design that employs steel reinforcement cords that are plated or unplated and which have been cut to fixed lengths. Where the steel reinforcement cords are unplated, i.e., bright steel, the vulcanized rubber composition containing silane compounds adheres to the entire surface area of the reinforcement cord. Where the steel reinforcement cords comprise plated steel, bright steel surfaces may be found at each of the cord ends at the cross section where the cords were cut. Vulcanized rubber compositions containing these silane compounds will adhere to such bright steel surfaces.

A non-limiting exemplary method for preparing the vulcanizable rubber compositions was performed. A typical skim formulation used for belt reinforcement of tires was mixed on an 1.1 L Banbury mixer. Mix times were about seven minutes with a final Banbury temperature of 325° F. (163° C.). The stocks mixed in this manner were final milled at a temperature below 220° F. (104° C.). At this time, the silane adhesion promoters were added to the skim stock. Formulations are provided in Tables III and IV.

TABLE III

| | Final Mill Mix - Masterbatches A and B | | | | | | | |
|---|---|---|---|---|---|---|---|---|
| | 1 | 2 | 3 | 4 | 5 | 6 | 7 | 8 |
| Masterbatch A | 163 | 163 | 163 | 163 | 0 | 0 | 0 | 0 |
| Masterbatch B | 0 | 0 | 0 | 0 | 161 | 161 | 161 | 161 |
| sulfur (80%) in oil | 3.5 | 3.5 | 3.5 | 3.5 | 3.5 | 3.5 | 3.5 | 3.5 |
| pre-vulcanization inhibitor | 0.3 | 0.3 | 0.3 | 0.3 | 0.3 | 0.3 | 0.3 | 0.3 |
| accelerator | 0.9 | 0.9 | 0.9 | 0.9 | 0.9 | 0.9 | 0.9 | 0.9 |
| HMTA/SA[a] | 2.2 | 2.2 | 2.2 | 2.2 | 0 | 0 | 0 | 0 |
| resorcinol hexamethylene tetraamine | 0 | 0 | 0 | 0 | 2.2 | 2.2 | 2.2 | 2.2 |
| aminosilane | 0.5 | 2.0 | 0 | 0 | 0.5 | 2.0 | 0 | 0 |
| mercaptosilane | 0 | 0 | 0.5 | 2.0 | 0 | 0 | 0.5 | 2.0 |
| TOTAL | 170.4 | 171.9 | 170.4 | 171.9 | 168.4 | 169.9 | 168.4 | 169.9 |

[a]hexamethylene tetraamine/stearic acid (95:5)

TABLE IV

| | Final Mill Mix - Masterbatches C and D | | | | | | | |
|---|---|---|---|---|---|---|---|---|
| | 9 | 10 | 11 | 12 | 13 | 14 | 15 | 16 |
| Masterbatch C | 171 | 171 | 171 | 171 | 0 | 0 | 0 | 0 |
| Masterbatch D | 0 | 0 | 0 | 0 | 167 | 167 | 167 | 167 |
| sulfur (80%) in oil | 7.5 | 7.5 | 7.5 | 7.5 | 6.0 | 6.0 | 6.0 | 6.0 |
| pre-vulcanization inhibitor | 0.4 | 0.4 | 0.4 | 0.4 | 0 | 0 | 0 | 0 |
| accelerator | 0.6 | 0.6 | 0.6 | 0.6 | 0 | 0 | 0 | 0 |
| antioxidant | 1.0 | 1.0 | 1.0 | 1.0 | 0 | 0 | 0 | 0 |
| RFR[a] | 0 | 0 | 0 | 0 | 4.0 | 4.0 | 4.0 | 4.0 |
| TBBS[b] | 0 | 0 | 0 | 0 | 0.35 | 0.35 | 0.35 | 0.35 |
| aminosilane | 0.5 | 2.0 | 0 | 0 | 0.5 | 2.0 | 0 | 0 |
| mercaptosilane | 0 | 0 | 0.5 | 2.0 | 0 | 0 | 0.5 | 2.0 |
| TOTAL | 181.0 | 182.5 | 181.0 | 182.5 | 177.85 | 179.35 | 177.85 | 179.35 |

[a]resorcinol formaldehyde resin
[b]t-butyl benzothiazole sulfeneamide

The tests utilized T-adhesion pads prepared by placing 60 gauge (1.5 mm) slabs of uncured, fully compounded rubber skim stock on 50 gauge (1.3 mm) fabric-reinforced rubber backing. Commercial bright steel wire was placed between two pads of the reinforced rubber skim stock with the wires in contact with the uncured rubber skim at 1.25 cm intervals. The width of each adhesion pad was 1.25 cm. The assembly procedure was as follows:

a) Using a 15.24×1.25 cm die, an adequate number of calendered and control stock samples for T-adhesion pad building were prepared.

b) On a piece of calendered fabric-reinforced rubber backing (0.1295 cm), one piece of 60 gauge (1.5 mm) control rubber skim stock was laid on the fabric backing and the sample placed, fabric side down, in a building jig.
c) Ten cords (brass- or zinc-coated wire) were placed on the sample in the jig.
d) Another 2-ply assembly, made as in items (a)-(b), was placed on top of cords so as to form a sandwiched composite.
e) The pads were cured for 30 minutes at 300° F. (149° C.) and, where indicated, steam bomb aged for one hour at 300° F. (149° C.) before being allowed to equilibrate for 24 hours prior to pre-heating and testing.

The pads were placed in a preheated curing mold and were cured for 30 minutes at 149° C. Rubber-steel cord adhesion testing was done on a Model 1130 Instron Universal Tester at a crosshead speed of 25.4 cm/min and 110° C.; the T-adhesion pads were preheated in the 110° C. oven for 20 minutes prior to testing. The reported value is an average of ten tests.

Several tests were conducted on each of the 16 stocks for comparison. Tables V and VI show the results of the testing under normal (unaged) conditions, in a steam bomb at 90% relative humidity at 95° F. (30° C.) for 60 to 180 days, and in a humidity chamber for 7 or 14 days. Humidity chamber aging is significant for determining the chemical stability of chemical bonds formed between the rubber stock and the metallic reinforcement when exposed to conditions of high relative humidity and high temperature, as compared to ambient, and extended periods of time. The force necessary to pull or remove the metallic reinforcement from the vulcanized rubber skim stock, in kg/cm, is given first followed by the percent of rubber skim stock remaining on the surface of the metallic reinforcement (determined by visual examination, reported as % rubber coverage).

TABLE V

Physical Properties - Masterbatches A and B

|  | 1 | 2 | 3 | 4 | 5 | 6 | 7 | 8 |
|---|---|---|---|---|---|---|---|---|
| Monsanto rheometer, 300° F. | | | | | | | | |
| TS(2)$^a$ (minutes) | 5.4 | 2.7 | 3.2 | 1.6 | 5.1 | 2.7 | 3.9 | 1.9 |
| TC(90)$^b$ (minutes) | 17.4 | 15.0 | 15.1 | 13.8 | 16.2 | 15.5 | 15.3 | 15.2 |
| IP(L)$^c$ | 9.5 | 12.9 | 8.8 | 10.1 | 8.8 | 12.3 | 8.9 | 10.1 |
| IP(90)$^d$ | 46.3 | 47.3 | 44.4 | 45.1 | 45.7 | 47.4 | 46.0 | 47.0 |
| IP(100)$^e$ | 50.4 | 51.3 | 48.4 | 49.0 | 49.8 | 51.3 | 50.1 | 51.1 |
| Cure rate index | 8.3 | 8.1 | 8.4 | 8.2 | 9.0 | 7.8 | 8.8 | 7.5 |
| Ring tensile, 23 hr. @ 300° F. | | | | | | | | |
| Modulus, 300% (MPa) | 22.43 | — | 21.25 | 21.39 | 20.42 | — | 19.46 | 19.80 |
| Tensile, break (MPa) | 22.56 | 19.94 | 21.25 | 21.39 | 20.42 | 18.29 | 20.01 | 20.84 |
| Elongation (%) | 310 | 270 | 300 | 300 | 300 | 260 | 310 | 320 |
| T-adhesion to steel cord | | | | | | | | |
| Unconditioned (kg/cm) | 12.5 (0) | 12.9 (0) | 14.3 (0) | 16.8 (0) | 11.1 (0) | 8.9 (0) | 14.3 (10) | 15.0 (10) |
| Steam bomb (kg/cm) | 21.4 (10) | 21.1 (10) | 21.1 (10) | 24.6 (20) | 15.7 (0) | 14.6 (0) | 15.4 (10) | 18.9 (10) |
| Unconditioned (kg/cm) | 5.0 (0) | 5.7 (0) | 4.3 (0) | 6.4 (0) | 4.6 (0) | 5.0 (0) | 5.0 (0) | 9.6 (0) |
| Steam bomb (kg/cm) | 13.6 (0) | 12.9 (0) | 9.3 (0) | 14.3 (0) | 8.6 (0) | 8.2 (0) | 8.9 (0) | 10.7 (0) |
| Humidity chamber (15 lb.) | | | | | | | | |
| Green adhesion, 7 days | — | — | — | — | — | — | 50.3 (90) | 42.5 (90) |
| Green adhesion, 14 days | — | — | — | — | — | — | 20.4 | 43.2 |

$^a$time to scorch
$^b$time to 90% cure
$^c$minimum torque
$^d$90% of maximum torque
$^e$maximum torque

TABLE VI

Physical Properties - Masterbatches C and D

|  | 9 | 10 | 11 | 12 | 13 | 14 | 15 | 16 |
|---|---|---|---|---|---|---|---|---|
| Monsanto rheometer, 300° F. | | | | | | | | |
| TS(2)$^a$ (minutes) | 5.7 | 2.7 | 4.7 | 2.0 | 6.7 | 4.7 | 3.6 | 3.2 |
| TC(90)$^b$ (minutes) | 17.3 | 18.8 | 15.0 | 15.3 | 18.0 | 13.0 | 12.0 | 11.8 |
| IP(L)$^c$ | 7.3 | 8.3 | 7.9 | 9.8 | 7.0 | 8.8 | 7.9 | 9.7 |
| IP(90)$^d$ | 42.2 | 47.7 | 37.5 | 38.6 | 37.5 | 42.1 | 40.4 | 40.2 |
| IP(100)$^e$ | 46.1 | 52.1 | 40.8 | 41.8 | 40.9 | 45.8 | 44.0 | 43.6 |
| Cure rate index | 8.6 | 6.2 | 9.7 | 7.5 | 3.7 | 4.2 | 3.8 | 3.6 |
| Ring tensile, 23 hr. @ 300° F. | | | | | | | | |
| Modulus, 300% (MPa) | 15.23 | 18.98 | 13.11 | 13.52 | 12.21 | 14.15 | 12.01 | 12.63 |
| Tensile, break (MPa) | 18.70 | 19.46 | 16.84 | 17.46 | 16.49 | 17.73 | 16.15 | 18.63 |
| Elongation (%) | 350 | 330 | 370 | 360 | 380 | 370 | 370 | 400 |

TABLE VI-continued

Physical Properties - Masterbatches C and D

|  | 9 | 10 | 11 | 12 | 13 | 14 | 15 | 16 |
|---|---|---|---|---|---|---|---|---|
| T-adhesion to steel cord | | | | | | | | |
| Unconditioned (kg/cm) | 13.9 (0) | 6.4 (0) | 16.8 (10) | 6.4 (0) | 27.5 (60) | 21.2 (20) | 32.9 (80) | 29.3 (60) |
| Steam bomb (kg/cm) | 11.8 (0) | 8.9 (0) | 16.8 (0) | 8.6 (0) | 24.6 (30) | 23.2 (20) | 27.5 (50) | 35.0 (70) |
| Unconditioned (kg/cm) | 2.9 (0) | 2.9 (0) | 3.9 (0) | 3.2 (0) | 6.4 (0) | 4.6 (0) | 8.9 (0) | 5.0 (0) |
| Steam bomb (kg/cm) | 4.2 (0) | 2.9 (0) | 3.9 (0) | 2.1 (0) | 7.9 (0) | 6.4 (0) | 8.9 (0) | 9.6 (0) |
| Humidity chamber (15 lb.) | | | | | | | | |
| Green adhesion, 7 days | 32.5 (80) | 45.4 (80) | 42.1 (80) | 31.1 (90) | 58.9 (100) | 49.7 (90) | 26.8 (80) | 55.0 (100) |

[a]time to scorch
[b]time to 90% cure
[c]minimum torque
[d]90% of maximum torque
[e]maximum torque Typical properties for a reinforcing belt skim would include Shore A values of over 55, 300% modulus values of at least 6.9 MPa and elongations at break of at least 250%. With reference to the physical properties reported in Tables V and VI, all of the Examples showed 300% modulus and elongation exceeding these values. T-adhesion values between rubber and bright steel (unaged) were acceptable inasmuch as any adhesion is an improvement over conventional stocks without the adhesion promoting additives of the present invention, where little to no adhesion is obtained. Steam bomb values were good and humidity chamber aging values were very good.

In light of the foregoing, addition of certain silane compounds into vulcanizable rubber compounds thus has been shown to promote adhesion between the rubber compounds and bright steel. Known uses of such rubber compounds include belt skims for belted tires, repair stocks for retreading of steel belts where bright steel wire is exposed, and to enclose the bare steel ends of cut wire belts. Other uses are evident in any application where rubber would be bonded to unplated bright steel surfaces such as golf club grips, motor mounts, cutless bearings, torsilastic springs, power belts, printing rolls, metal wire reinforced or braided hose, electrical deicers, shoe heels and wherever it is desired to secure rubber to metal or provide a flexible and strong, thermally stable bond between the same.

As apparent to those skilled in the art, the formulations of the rubber composition can be varied within the scope of the total specification disclosure by selection of various amounts of the silane compounds of the present invention and by substitution of various components for any of the other, non-inventive components of the rubber composition as well as the amounts thereof. In accordance with the patent statutes, preferred embodiments of the present invention have been described; however, the present invention is not to be limited thereby and, instead, includes all modifications and variations that fall within the scope of the attached claims.

We claim:

1. A method of providing a composite comprising steel reinforcement adhered to rubber, comprising:
    a) providing a blended composition from ingredients that comprise
        (1) at least one rubber,
        (2) a filler component comprising carbon black particles and, optionally, silica particles, wherein the ratio of said carbon black particles to said silica particles is at least 4:1,
        (3) a sulfur curing agent, and
        (4) a silane component comprising at least one of an aminosilane and a mercaptosilane;
    b) forming a layer of rubber stock from said blended composition; and
    c) incorporating steel reinforcement into said rubber stock to provide a reinforced composite, said steel reinforcement having at least some of its surface area being untreated, wherein said silane component acts to bond said at least one rubber to said steel reinforcement in at least the untreated surface area.

2. The method of claim 1 wherein said blended composition is provided from ingredients that comprise, per 100 parts of said at least one rubber, from 0.1 to about 10 parts by weight of said silane component.

3. The method of claim 2 wherein said blended composition is provided from ingredients that comprise, per 100 parts of said at least one rubber, from 0.5 to about 5 parts by weight of said silane component.

4. The method of claim 1 wherein said blended composition is provided from ingredients that comprise, per 100 parts of said at least one rubber, up to about 2 parts by weight of said silane component.

5. The method of claim 1 wherein said blended composition is provided from ingredients that comprise, per 100 parts of said at least one rubber, from about 5 to about 100 parts by weight of said carbon black particles.

6. The method of claim 1 further comprising curing said reinforced composite so as to provide a vulcanized rubber article.

7. The method of claim 1 wherein said blended composition is free of metallic salts and complexes.

8. The method of claim 1 wherein said carbon black particles are furnace blacks, channel blacks, lamp blacks, acetylene blacks, or combinations of two or more of the foregoing.

9. The method of claim 1 wherein said carbon black particles are selected from those designated as N-110, N-220, N-339, N-330, N-343, N-550, or N-660 as determined by the CTAB technique of ASTM D-1765.

10. A reinforced composite comprising steel reinforcement embedded in a rubber stock, said steel reinforcement comprising at least a portion of its surface area that is not treated and said rubber stock being derived from a blended composition that comprises
- (1) at least one rubber,
- (2) a filler component comprising carbon black particles and, optionally, silica particles, wherein the ratio of said carbon black particles to said silica particles is at least 4:1,
- (3) a sulfur curing agent, and
- (4) a silane component comprising at least one of an aminosilane and a mercaptosilane, said silane component acting to bond said at least one rubber to said steel reinforcement in at least its untreated surface area.

11. The reinforced composite of claim 10 wherein said blended composition is provided from ingredients that comprise, per 100 parts of said at least one rubber, from 0.1 to about 10 parts by weight of said silane component.

12. The reinforced composite of claim 11 wherein said blended composition is provided from ingredients that comprise, per 100 parts of said at least one rubber, from 0.5 to about 5 parts by weight of said silane component.

13. The reinforced composite of claim 10 wherein said blended composition is provided from ingredients that comprise, per 100 parts of said at least one rubber, up to about 2 parts by weight of said silane component.

14. The reinforced composite of claim 10 wherein said blended composition is provided from ingredients that comprise, per 100 parts of said at least one rubber, from about 5 to about 100 parts by weight of said carbon black.

15. The reinforced composite of claim 10 wherein said rubber stock is vulcanized.

16. The reinforced composite of claim 10 wherein said blended composition is free of one of resorcinol and metallic salts and complexes.

17. The reinforced composite of claim 10 wherein said carbon black particles are furnace blacks, channel blacks, lamp blacks, acetylene blacks, or combinations of two or more of the foregoing.

18. The reinforced composite of claim 10 wherein said carbon black particles are designated as N-110, N-220, N-339, N-330, N-343, N-550, or N-660 as determined by the CTAB technique of ASTM D-1765.

* * * * *